(12) United States Patent
Chang et al.

(10) Patent No.: US 7,320,555 B2
(45) Date of Patent: Jan. 22, 2008

(54) CARDAN SHAFT STRUCTURE WITH TIGHTNESS ADJUSTABLE FUNCTIONS

(75) Inventors: Cheng-Chung Chang, Hsi-Chi (TW); Yi-Fei Yu, Keelung (TW)

(73) Assignee: Sercomm Corporation, Miaoli County (TW)

( * ) Notice: Subject to any disclaimer, the term of this patent is extended or adjusted under 35 U.S.C. 154(b) by 113 days.

(21) Appl. No.: 11/251,055

(22) Filed: Oct. 14, 2005

(65) Prior Publication Data

US 2007/0086849 A1    Apr. 19, 2007

(51) Int. Cl.
*A61B 17/56* (2006.01)
*F16C 11/06* (2006.01)

(52) U.S. Cl. .......................... 403/122; 403/76; 403/77; 403/114; 403/297; 403/314; 606/53; 606/60; 606/61; 248/288.31; 248/663

(58) Field of Classification Search ................. 403/56, 403/90, 131, 309, 312, 367–374.5, 76, 77, 403/114, 122, 297, 314; 248/288.31, 481, 248/484, 663; 411/44, 55, 69, 71, 76–78, 411/537; 606/60, 61, 53
See application file for complete search history.

(56) References Cited

U.S. PATENT DOCUMENTS

| 2,752,214 | A | * | 6/1956 | Ferris ....................... 74/579 R |
| 2,984,249 | A | * | 5/1961 | Sears, Jr. et al. ........... 403/131 |
| 3,042,094 | A | * | 7/1962 | Liljeberg .................... 411/271 |
| 3,432,214 | A | * | 3/1969 | Cashman et al. ........... 403/156 |
| 3,874,264 | A | * | 4/1975 | Polos ........................ 411/80.6 |
| 3,911,782 | A | * | 10/1975 | Liebig ........................ 411/24 |
| 4,127,119 | A | * | 11/1978 | Kronner ....................... 606/56 |
| 4,388,921 | A | * | 6/1983 | Sutter et al. ................. 411/537 |
| 4,454,802 | A | * | 6/1984 | Cailliau et al. ............... 92/158 |
| 4,520,983 | A | * | 6/1985 | Templeman ................. 403/90 |
| 4,767,231 | A | * | 8/1988 | Wallis ......................... 403/90 |
| 5,048,646 | A | * | 9/1991 | Carlsson ..................... 188/4 B |
| 5,062,655 | A | * | 11/1991 | Sommerer ................. 403/131 |
| 5,114,261 | A | * | 5/1992 | Sugimoto et al. ........... 403/122 |
| 5,445,030 | A | * | 8/1995 | Hagen ......................... 73/663 |
| 5,501,684 | A | * | 3/1996 | Schlapfer et al. ............. 606/61 |
| 5,713,900 | A | * | 2/1998 | Benzel et al. ................. 606/60 |
| 5,807,010 | A | * | 9/1998 | Parker et al. ............... 403/122 |
| 6,059,480 | A | * | 5/2000 | Maughan et al. ........... 403/131 |
| 6,238,126 | B1 | * | 5/2001 | Dall .......................... 403/122 |
| 6,514,002 | B1 | * | 2/2003 | Katae et al. ................. 403/150 |
| 6,851,688 | B2 | * | 2/2005 | Barry ........................ 403/122 |
| 7,178,815 | B2 | * | 2/2007 | Cai et al. ............... 280/124.107 |

FOREIGN PATENT DOCUMENTS

GB    1387663 A  *  3/1975
WO    WO 8803781 A1  *  6/1988

* cited by examiner

*Primary Examiner*—Daniel P. Stodola
*Assistant Examiner*—Ernesto Garcia

(57) ABSTRACT

A cardan shaft structure with tightness adjustable functions has a through-hole passing through spheres located at both ends of the cardan shaft body, and a taper socket respectively installed into the opening end of each sphere. A bolt is inserted into both spheres and the body, fixed and locked together in conjunction with a nut. The cardan shaft structure works together with two clamping components wrapping around the spheres. When the sphere is being pushed against (or freed from) the inner wall of the clamping component by tightening (or loosing) the bolt so as to make the sphere either expand (or recover), the angle displacement of the clamping component becomes adjustable accordingly.

4 Claims, 5 Drawing Sheets

CARDAN SHAFT STRUCTURE WITH TIGHTNESS ADJUSTABLE FUNCTIONS

BACKGROUND OF THE INVENTION

1. Field of the Invention

The present invention relates generally to the field of a universal joint technology, which is used for the purpose of angle adjustment.

2. The Prior Arts

In light of many different situations, it usually needs a universal joint device to solve the problem of dead angles on some actions.

According to FIG. 5, it shows a known universal joint structure, which has a sphere head A located internally in a body, where the sphere head A has a quadrant orifice A1 penetrating through both ends, and the sphere head A is being linked to the body by a spline shaft B which is penetrating through the quadrant orifice A1. In addition, there are bearing plate C and spring D installed for connecting inner area in-between the sphere head A and the body, and hence frictional action force will be generated further in-between bearing plate C and sphere head A by the time the spring D is pushing against bearing plate C. Therefore, when it is combined with adjusting the angle for ferrule A2 of the sphere head, the ferrule A2 will be fixed and locked automatically if the bearing plate C is pushing against the sphere head A. However, there is a limitation on action force generated by the spring. Even though the ferrule has already been locked at a particular angle, its adjusted angle would be very easy to be changed if it is effected by some other external action force, and the turning angle of the sphere is also directly subjected to the taper degree of the quadrant orifice. In other words, the conventional universal joint structure shown in FIG. 5 is suitable only for the micro tool or instrument requiring a minimal action force with a small degree of adjustable range.

SUMMARY OF THE INVENTION

A primary objective of the present invention is to solve the problem of the above-mentioned smaller degree of adjustable range as well as an imperfect fixed force after adjustment for a traditional cardan shaft structure.

The present invention is achieving the above object by means of the following technology:

The cardan shaft structure with tightness adjustable functions in accordance with the present invention mainly comprises a body, two spheres, a bolt and a nut; wherein the two spheres are coupled with both ends of the body respectively, in which one sphere is combined with the body and acting as a whole, and either the other sphere is then being separated out of the body; or instead both spheres are all combined with the body and acting as a whole. The body has a through-hole penetrating through both spheres at its both ends, wherein there are a plurality of grooves equipped into side walls of the two spheres respectively. The grooves separate each sphere into several portions equally. There is a tapered socket portion equipped at an opening end of each sphere, and therefore by inserting a bolt into the central hole of one sphere, and then locking it with a nut from the position of another sphere, both spheres can be fixed and locked by the clamping plate of a clamping component. Additionally, both spheres of the cardan shaft will be expanded or recovered by turning the head of the bolt. The inner wall of the clamping plate will be pushed against while the sphere is being expanded. In contrast, the angle degree of the cardan shaft is adjustable by turning the clamping component while the inner wall of the clamping plate is being loosened.

In comparison with a traditional universal joint device, the present invention primarily utilizes a cardan shaft structure, combining with the adjustable function in-between the bolt and nut so as to make the sphere expand or recover to its original condition, in order to achieve an angle displacement on moving component consequently; and by using this simple structure it has not only resolved the problem of smaller degree adjustable range and imperfect adjustment for a traditional universal joint but also achieved the object in reducing maintenance cost and increasing the convenience at the same time.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
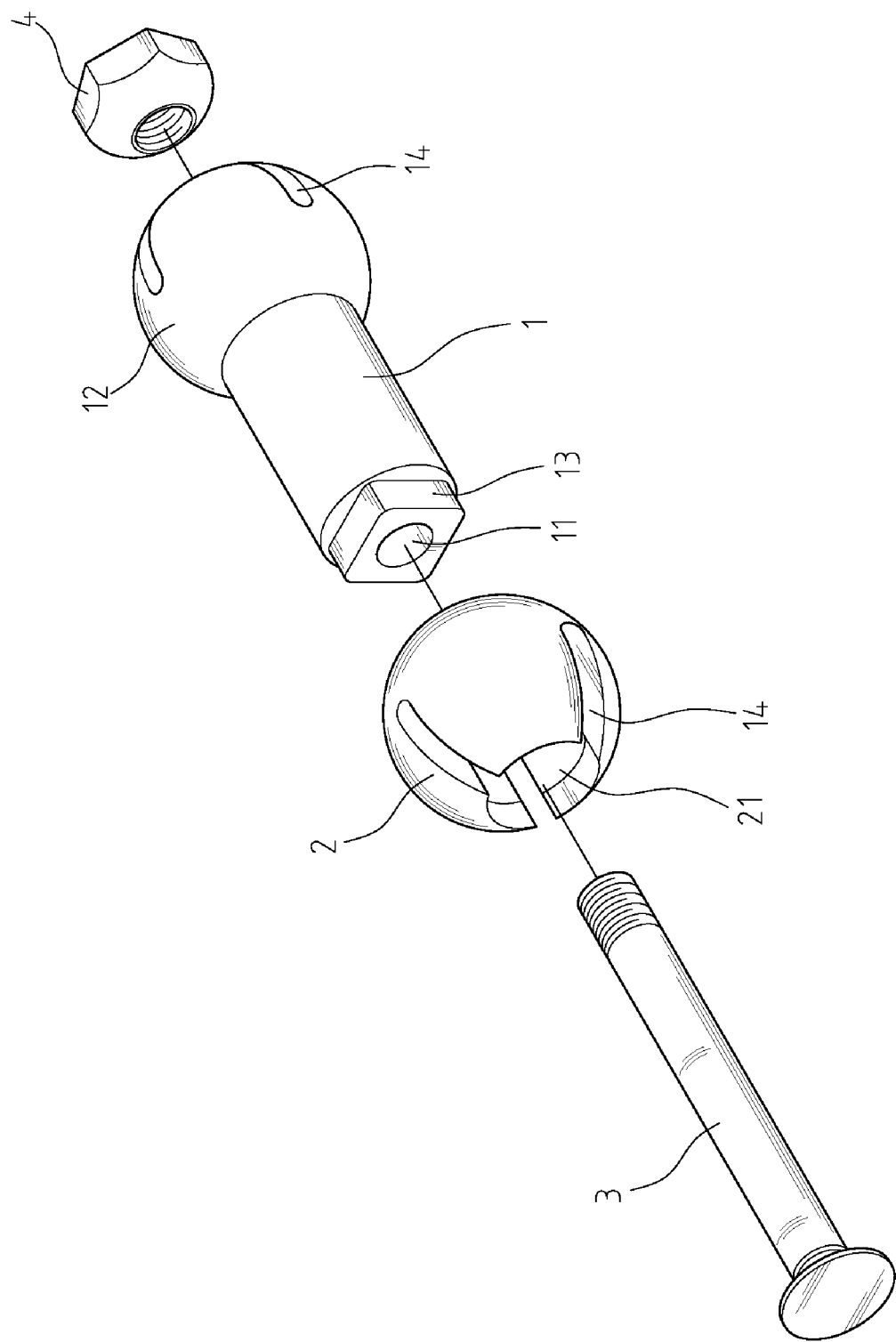
FIG. 1 is an exploded view of preferred embodiment of the cardan shaft structure with tightness adjustable functions in accordance with the present invention.
Figure 2:
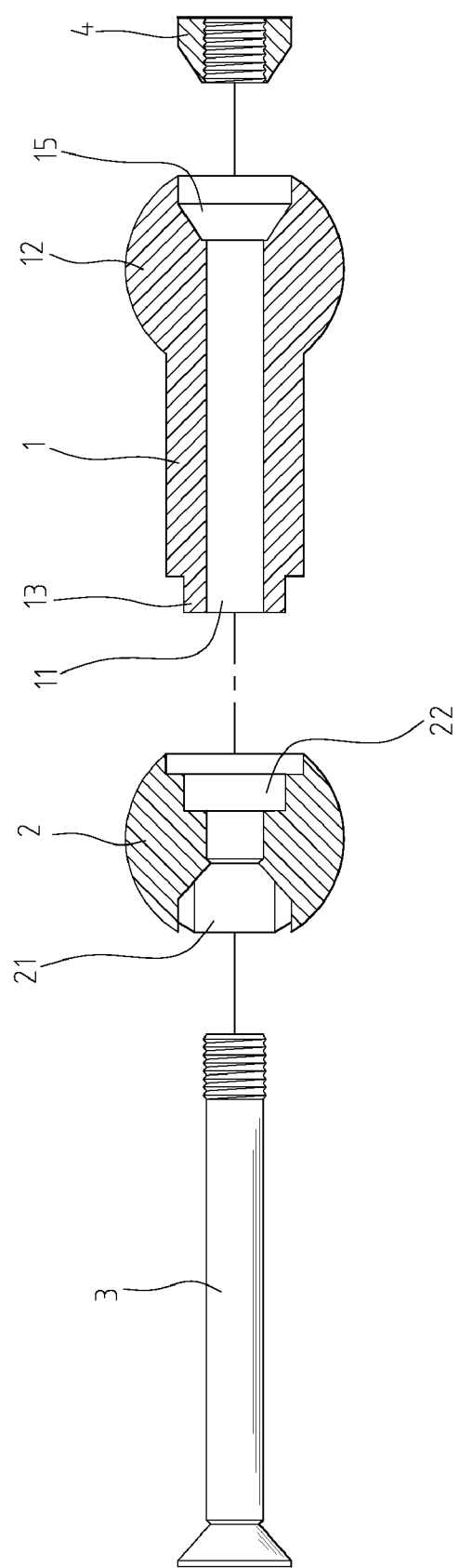
FIG. 2 is a cross-sectional view of preferred embodiment of the cardan shaft structure with tightness adjustable functions in accordance with the present invention, which is under disassembled condition.
Figure 3:
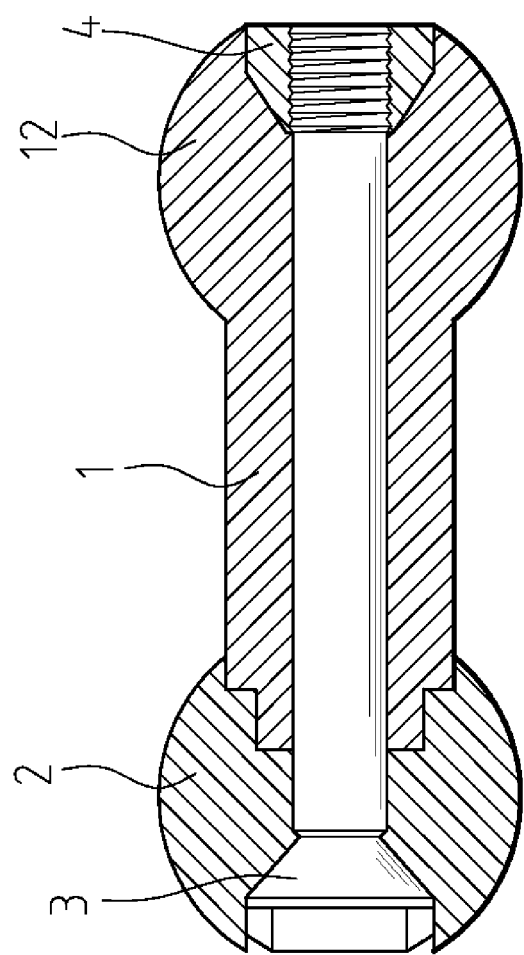
FIG. 3 is a cross-sectional view of preferred embodiment of the cardan shaft structure with tightness adjustable functions in accordance with the present invention, which is under assembled condition.

With reference to both FIG. 1 and FIG. 2, it is an exploded view of the preferred embodiment of the present invention, wherein the present invention comprises a body 1 having two spheres 2, 12 located at its two ends respectfully. One of the spheres is being fixed at one end of the body 1, and the other sphere 2 is separated from the body. The body 1 has a through-hole 11 located at its center portion, and penetrating through its two ends and the two spheres. There are a plurality of grooves 14 equipped at the side wall of fin sphere 12. In addition, there is a socket portion 15 equipped at the central hole at the end of the sphere 12 (as shown on FIG. 2). At another end of body 1, there is an extended portion 13, where the extended portion 13 can be either a square shape or multilateral shape. There is a recess portion 22, complementary to the extended portion 13, located at one end of the separated sphere 2, in such a way that the extended portion 13 and the recess portion 22 can be coupled together. A plurality of grooves 14 are equipped at the side wall of the sphere 2, passing through its central hole. A socket portion 21 is formed at an inner area of the central hole at the end. By inserting a bolt 3 sequentially through sphere 2, body 1 and sphere 12, the head of bolt is installed into the socket portion 21, and the external threads at another end of the bolt 3 are coupled with a nut 4, which is received in the socket portion 15 of the sphere 12. Please refer to the FIG. 3 for viewing the assembled construction.

Additionally, there is another way to utilize the preferred embodiment of the present invention and act as a whole piece, by combining both spheres 2, 12 and body 1, or connecting sphere 2, which is separated from body 1 as described in previous paragraph, together with body by welding method thereat.

In order to obtain a smooth appearance of sphere 2 and 12, the preferred embodiment of the present invention has, therefore, used a tack bolt to combine both spheres 2,12 and body 1, so as to insert the head of the bolt completely into socket portion 21 of the sphere 2. One end of the nut 4 is in a taper shape which is similar to the head of bolt 3, and thus the nut 4 can be easily inserted into the socket portion 15 of the sphere 12 after locking and coupling the nut 4 with the bolt 3.

Figure 4:
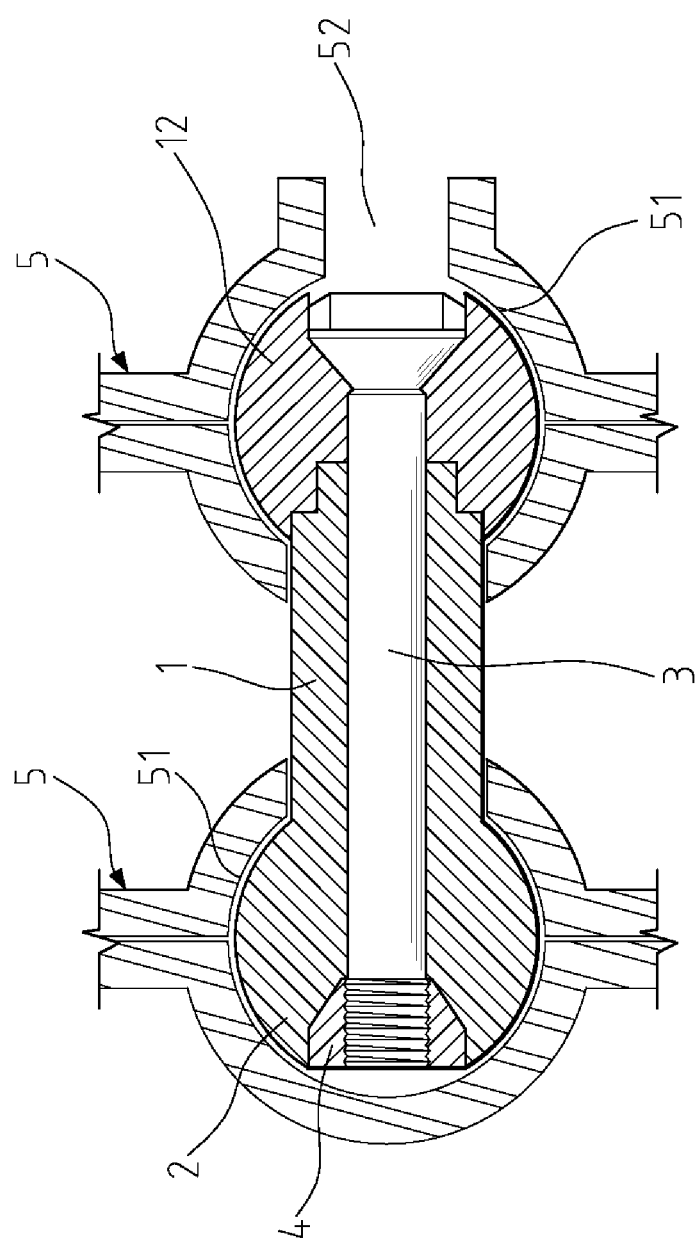
FIG. 4 is a schematic assembly view of preferred embodiment of the cardan shaft structure with tightness adjustable functions in accordance with the present invention, wherein the clamping component is fixed by expanded dual spheres while the bolt is being locked.
Figure 5:
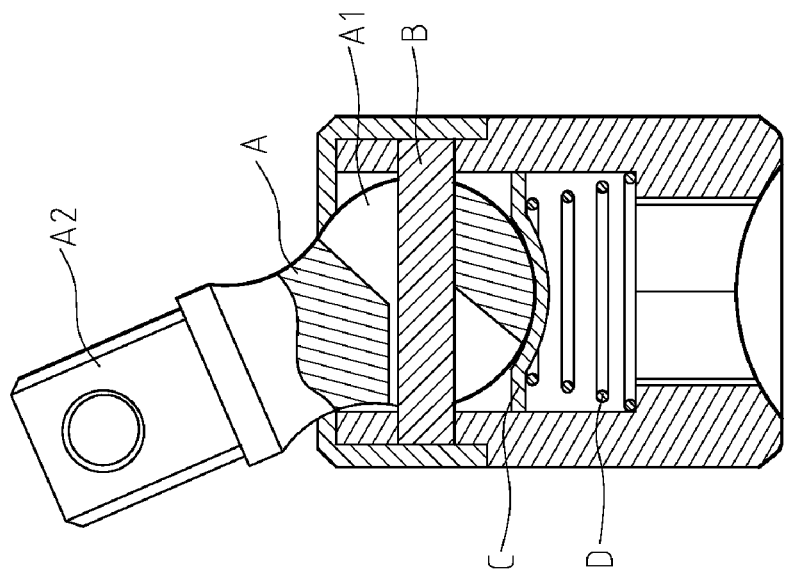
FIG. 5 is a cross-sectional view of known cardan shaft structure, which is under assembled condition.

With reference to the FIG. 4, it shows the preferred embodiment of the present invention in use. Two spheres 2, 12 of the present invention are used as a fastener, working together with two clamping components 5 each including two clamping plates 51, corresponding to the curved surface of each sphere 2, 12, so as to have either sphere 2 or 12 wrapped up by these two clamping plates 51, which will be coupled together by a screw (not shown in the figure) afterwards. The two spheres 2, 12 could be held into a circular space created by these two clamping plates 51; wherein a through-hole 52 is preserved at one side of one clamping component 5, in order to turn the bolt 3 successfully by inserting a screwdriver, for instance, or any other tool into the through-hole 52. When the bolt 3 is being locked tightly, the head of the bolt and the nut 4 will press against the socket portions 21, 15 of the two spheres 2, 12 at the same time, and hence force the spheres 2, 12 to expand outwardly against the inner wall of the clamping plate 51, resulting in both spheres 2, 12 to be fixed onto the clamping plate 51. As a result, the clamping component is unable to be turned at all. Whereas, if loosing the bolt 3, the head of bolt is separated to opposite direction from the nut 4, and therefore pressure force at the socket portion of the sphere will be released at once. As a result, both spheres 2, 12 are returning to their original shape by means of the spring force, and the clamping force in-between both spheres and the clamping plate 51 no longer exists. Under this circumstance, the angle degree of the clamping component 5 will become adjustable accordingly.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A cardan shaft structure with tightness adjustable functions, comprising:
    a body having a sphere located at both ends respectively, and a central hole penetrating through both ends and the two spheres, wherein a plurality of grooves are equipped into side walls of the two spheres respectively to outwardly expand the spheres, said grooves passing though said central hole and forming a mutual opening end with a tapered socket portion on each of the two spheres;
    a bolt penetrating from one of the spheres through the central hole of said body and the other of the spheres; and
    a nut being locked with said bolt and engaged with the tapered socket portion of said other sphere;
    wherein one end of said nut has a taper degree corresponding to an inner area of the engaged tapered socket portion of said other sphere.

2. The cardan shaft structure with tightness adjustable functions as claimed in claim 1, wherein each sphere is separated into several portions equally by a plurality of said grooves.

3. The cardan shaft structure with tightness adjustable functions as claimed in claim 1, wherein one of the spheres is combined with said body so as to act as a whole, and the other sphere is separated from said body.

4. The cardan shaft structure with tightness adjustable functions as claimed in claim 3, wherein a multilateral extended portion is located at one end of said body, and a recess portion complementary to said multilateral extended portion is formed on the separated sphere for coupling the separated sphere to said body.

* * * * *